United States Patent [19]

Tahara et al.

[11] Patent Number: 5,513,875
[45] Date of Patent: May 7, 1996

[54] LOCKABLE SUSPENSION SYSTEM FOR A WORK VEHICLE HAVING A STABILIZING LINK

[75] Inventors: Kouji Tahara; Seiji Tamura, both of Ibaraki, Japan

[73] Assignee: Hitachi Construction Machinery Co., Ltd., Tokyo, Japan

[21] Appl. No.: 204,186

[22] PCT Filed: Sep. 4, 1992

[86] PCT No.: PCT/JP92/01132

§ 371 Date: Mar. 4, 1994

§ 102(e) Date: Mar. 4, 1994

[87] PCT Pub. No.: WO93/04881

PCT Pub. Date: Mar. 18, 1993

[30] Foreign Application Priority Data

Sep. 19, 1991 [JP] Japan .................................. 3-257105

[51] Int. Cl.⁶ ...................................................... B60G 9/02
[52] U.S. Cl. ............................ 280/689; 280/709; 280/754
[58] Field of Search .................................... 280/754, 755, 280/707, 709, 710, 702, 714

[56] References Cited

U.S. PATENT DOCUMENTS

| | | | |
|---|---|---|---|
| 2,179,016 | 11/1939 | Leighton | 280/709 |
| 2,723,870 | 11/1955 | Page . | |
| 2,843,397 | 7/1958 | Bastow . | |
| 3,142,363 | 7/1964 | Tamini . | |
| 3,406,983 | 10/1968 | Masser . | |
| 3,909,036 | 9/1975 | Pound . | |
| 3,953,040 | 4/1976 | Unruh et al. . | |
| 4,144,978 | 3/1979 | Drake . | |
| 4,195,863 | 4/1980 | Richardson | 267/36.1 |
| 4,705,295 | 11/1987 | Fought | 280/754 |
| 4,717,170 | 1/1988 | Mounier-Poulnt et al. . | |
| 5,388,857 | 2/1995 | Wernimont et aL. | 280/755 |

FOREIGN PATENT DOCUMENTS

| | | | |
|---|---|---|---|
| 386418 | 11/1932 | France . | |
| 1307620 | 9/1962 | France . | |
| 2292602 | 11/1975 | France . | |
| 2424141 | 4/1978 | France . | |
| 2424142 | 4/1978 | France . | |
| 2589107 | 10/1985 | France . | |
| 838112 | 7/1949 | Germany . | |
| 1922852 | 9/1965 | Germany . | |
| 1978099 | 2/1968 | Germany . | |
| 6606345 | 9/1970 | Germany . | |
| 55-41939 | 3/1980 | Japan . | |
| 58-69110 | 5/1983 | Japan . | |
| 0183307 | 10/1983 | Japan | 280/754 |
| 58-54247 | 12/1983 | Japan . | |
| 59-89708 | 6/1984 | Japan . | |
| 61-21608 | 2/1986 | Japan . | |
| 61-179009 | 11/1986 | Japan . | |
| 63-32642 | 6/1988 | Japan . | |
| 938458 | 10/1963 | United Kingdom . | |
| 1483867 | 8/1977 | United Kingdom . | |
| 2093411 | 9/1982 | United Kingdom | 280/754 |

*Primary Examiner*—Matthew C. Graham
*Attorney, Agent, or Firm*—Oliff & Berridge

[57] ABSTRACT

The suspension system according to the present invention is provided with a shock absorbing spring interposed between an axle and a chassis frame and a pair of double acting cylinders provided at a fixed distance apart in the lateral direction of the vehicle having tube sides and rod sides pivotally supported by the chassis frame and the axle. A link restrains horizontal displacement in the longitudinal and lateral directions while permitting displacement in the vertical direction between the chassis frame and the axle. The link has one end linked to the chassis frame and the other end linked to the axle. During vehicle propulsion, the double acting cylinders are freed, and during excavation, the double acting cylinders are locked.

14 Claims, 8 Drawing Sheets

PRIOR ART

FIG.8

PRIOR ART

LOCKABLE SUSPENSION SYSTEM FOR A WORK VEHICLE HAVING A STABILIZING LINK

TECHNICAL FIELD

The present invention relates to a suspension system which is used in a work vehicle such as a wheel type hydraulic shovel or the like.

BACKGROUND ART

Figure 7:
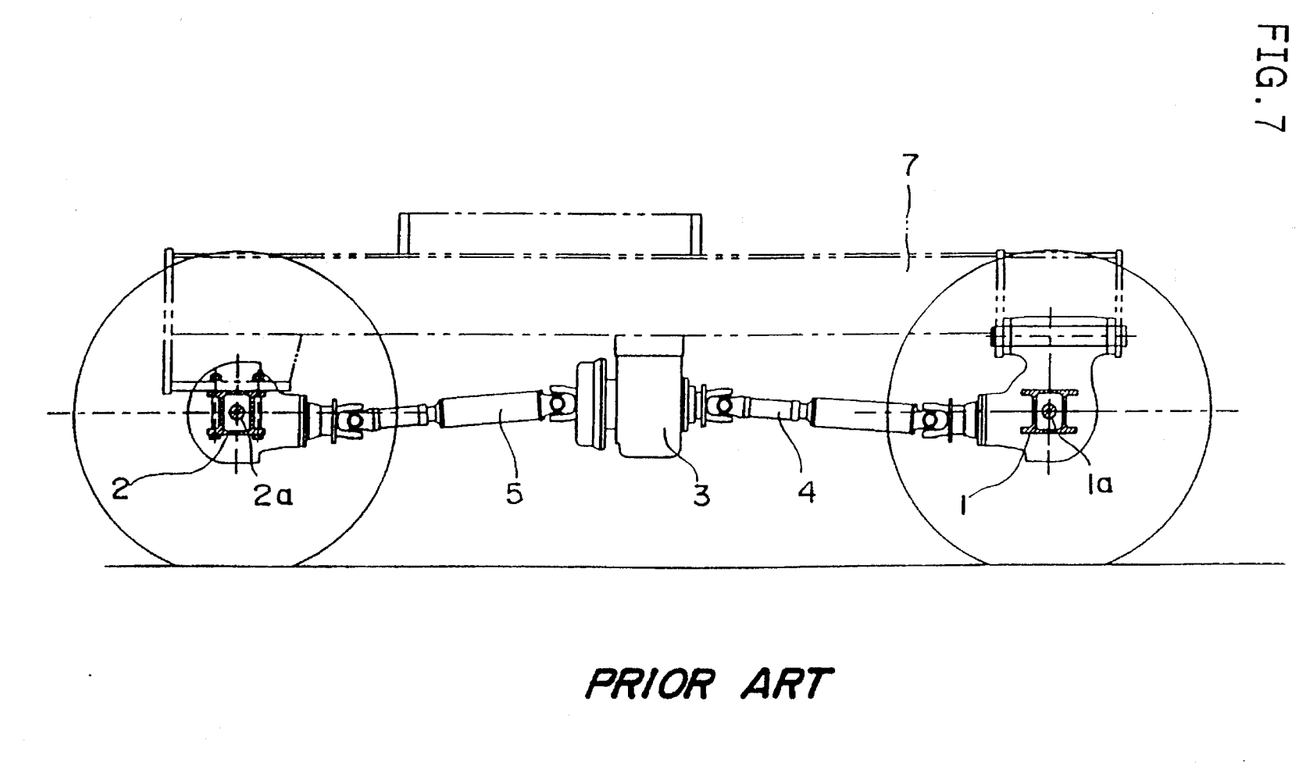
FIG. 7 is a side view of a wheel type hydraulic shovel showing a summary of the construction of a prior art suspension system.
Figure 8:
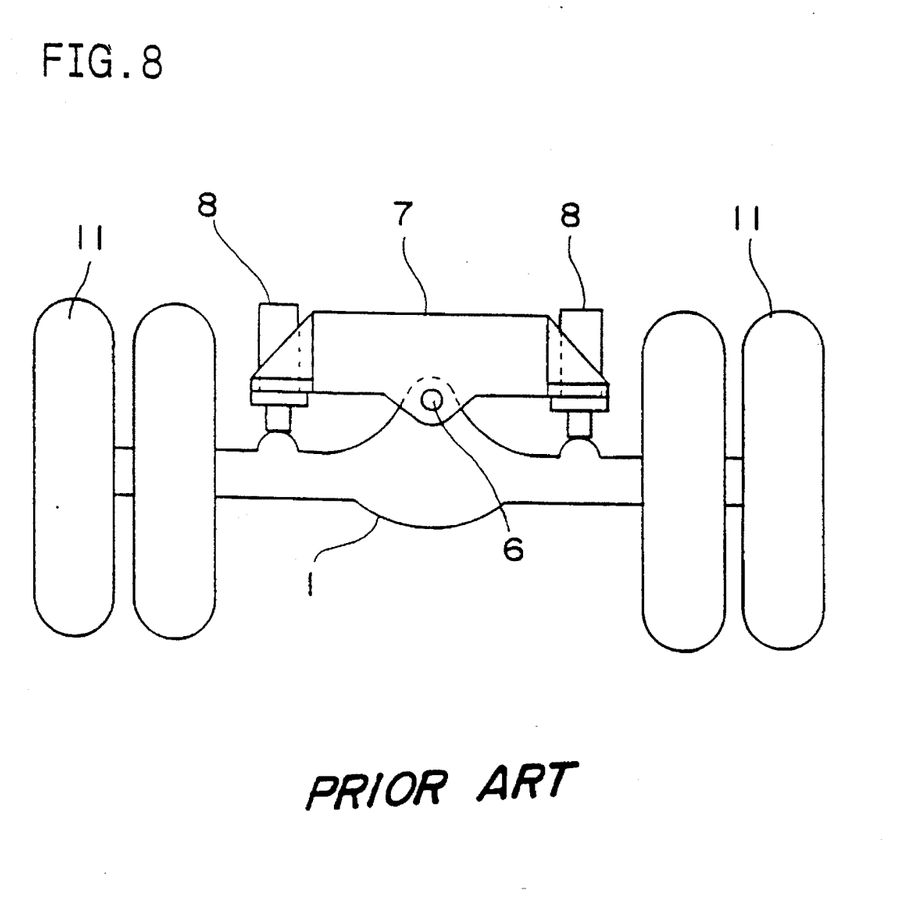
FIG. 8 is a figure showing the suspension system of FIG. 7 as seen rearwards along the vehicle.

FIGS. 7 through 10 show an example of a prior art suspension system of a wheel type hydraulic shovel. FIG. 7 is a side view of a lower propulsion unit of the wheel type hydraulic shovel. The reference symbol 1 denotes a front wheel axle and the reference symbol 2 denotes a rear wheel axle, and a front drive shaft 1a and a rear drive shaft 2a are inserted in central cavity portions of these axles 1 and 2. Propulsive force is transmitted from a transmission 3 to these front drive shaft 1a and rear drive shaft 2a via shafts 4 and 5. As shown in FIG. 8, a chassis frame 7 is connected to a central upper portion of the axle 1 for the front wheels via a pin 6 so as to be able to swivel in the lateral direction of the vehicle. A driver's seat and a working attachment made up from a boom, an arm and a bucket and the like, not shown in the figures, are provided on a rotating frame which is provided on the chassis frame 7 so as to be rotatable, and as shown in FIG. 8 single acting cylinders 8 are respectively fitted on the left and right ends with respect to the vehicle of the chassis frame 7. In FIG. 8, the reference symbols 11 denote tires.

Figure 9:
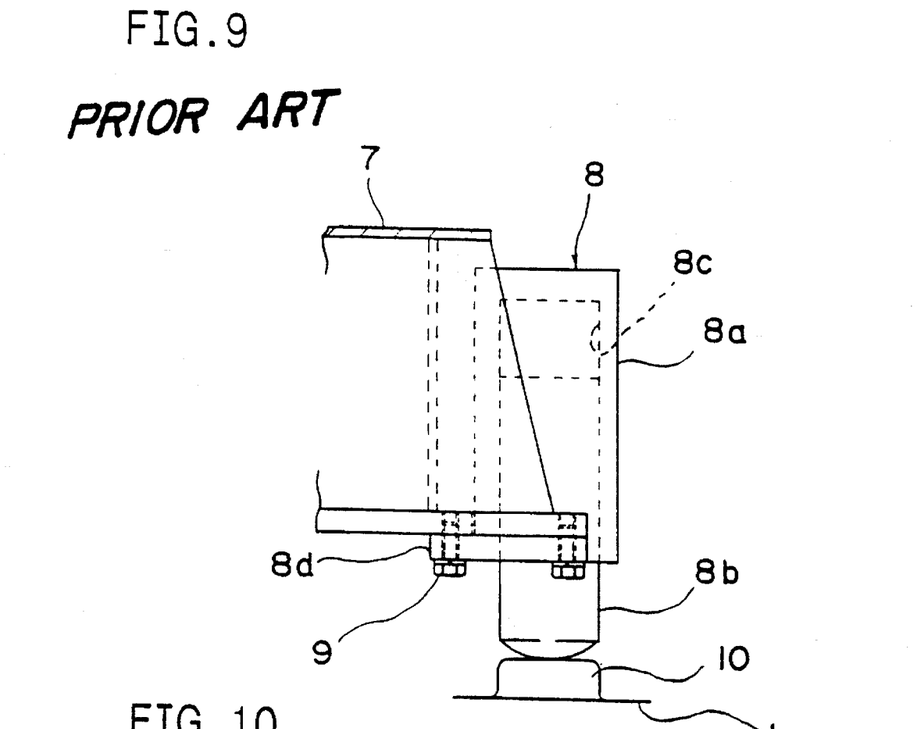
FIG. 9 is a detailed figure showing the attachment portions of a single acting cylinder of FIG. 7.
Figure 10:
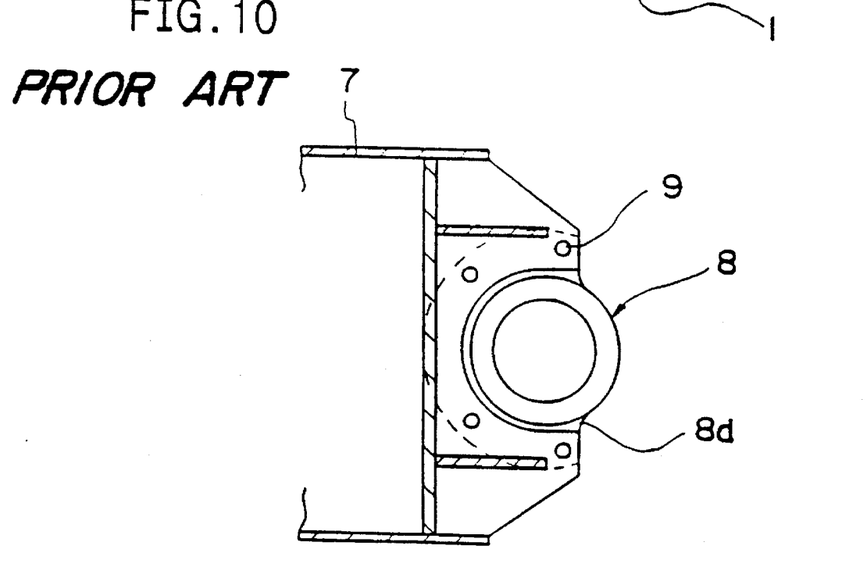
FIG. 10 is a plan view of FIG. 9.

In the single acting cylinders 8, as shown in FIGS. 9 and 10, a tube 8a is fixed to the chassis frame 7 by bolts 9 via a flange portion 8d, and the end of a piston rod 8b is contacted against a bracket 10 which is projected from the axle 1. During vehicle propulsion, the cylinder chambers 8c of the cylinders 8 are connected to a tank, so that piston rods 8b are freely extended and retracted, and thus the ground contacting performance of the left and right tires is improved. During excavation the cylinder chambers 8c are hydraulically locked, so that the stability of the vehicle body is assured during excavation by fixing the chassis frame 7 with respect to the axle 1.

However, with such a prior art suspension system of a work vehicle, since the axle 1 and the chassis frame 7 are directly connected together by the pin 6 so that no shock absorbing device is provided between them, and therefore during vehicle propulsion shocks from the road surface are directly input to the chassis frame, and there has been a problem with regard to riding quality. Further, although the moment load around the pin 6 caused by the rolling load during vehicle high speed cornering acts on the chassis frame 7, the single acting cylinders 8 keep free, so this moment load cannot be supported, and the chassis frame 7 rolls undesirably.

Although a suspension system used on a dump truck or the like can itself support a chassis frame of considerable weight, it is necessary for a work vehicle such as the wheel type hydraulic shovel or the like to which the present invention is addressed to perform work other than normal vehicle propulsion such as excavation or the like, and it is not possible to use a suspension system for a truck or the like, since large reaction forces to excavating are required to be supported in all directions longitudinally, laterally, and vertically to the vehicle.

SUMMARY OF THE INVENTION

The objective of the present invention is, for a work vehicle which performs work other than vehicle propulsion such as excavation or the like, without losing vehicle stability during excavation, to improve riding quality during vehicle propulsion and the anti rolling capability during vehicle high speed cornering.

The present invention is applicable to a suspension system for a work vehicle, which supports a chassis frame on a pair of front and rear wheel axles, and which during working causes load in the vertical direction, in the lateral direction, and in the longitudinal direction of the vehicle from the chassis frame to be transferred to the axles.

And the above described objective is attained by the construction which follows.

The suspension system according to the present invention includes a shock absorbing spring which is interposed between at least a one of the axles and the chassis frame; a pair of double acting cylinders which are provided at a fixed distance apart in the lateral direction of the vehicle, and whose tube sides and rod sides are respectively pivotally supported by the chassis frame and the axle; a link whose one end is linked to the chassis frame while the other end is linked to the axle so as to restrain horizontal displacement in the longitudinal and in the lateral direction while permit displacement in the vertical direction between the chassis frame and the axle, and which during working receives load in the longitudinal and in the lateral direction of the vehicle; and a changeover means which by locking the double acting cylinders obstructs the action of the shock absorbing spring, and by freeing the double acting cylinders permits the action of the shock absorbing spring.

During vehicle propulsion, the bottom chambers and the rod chambers of the double acting cylinders are connected to a tank, so that they are freed. Shocks from the road surface are absorbed by the shock absorbing spring. Further, when a tire falls off a bump which it has ridden up and over, the axle falls down slowly in comparison with the prior art, due to the resistance force when the double acting cylinders extend. The moment load acting upon the chassis frame due to the rolling load during vehicle high speed cornering is reduced by the resistance of the spring force of the shock absorbing spring, so that the rolling of the chassis frame during vehicle high speed cornering is restrained.

If the bottom chambers and the rod chambers of the double acting cylinders are respectively connected to the tank via restrictor, a hydraulic resistance force is generated when the double acting cylinders retract, so that the double acting cylinders 22L and 22R can be made to function as hydraulic dampers.

During excavation work the rod chambers and the bottom chambers of the double acting cylinders are locked. Although during excavation work the chassis frame tends to roll due to the load acting on the chassis frame via the work attachment, this movement is restrained by the double acting cylinders. On the other hand, although the chassis frame tends to move in the longitudinal direction and in the lateral direction of the vehicle due to the load during excavation, this movement is restrained by the link. Accordingly, although the riding quality and the anti rolling performance are improved over the prior art, there is no loss of stability of the vehicle during excavation.

BEST MODE FOR CARRYING OUT THE INVENTION

An embodiment of the present invention will be described with reference to FIG. 1A through FIG. 6, for the case that the present invention is applied to a suspension system for a wheel type hydraulic shovel. Elements identical to ones in FIG. 7 through FIG. 10 will be denoted by identical reference symbols, and the explanation will concentrate upon the points of difference.

Figure 1A:
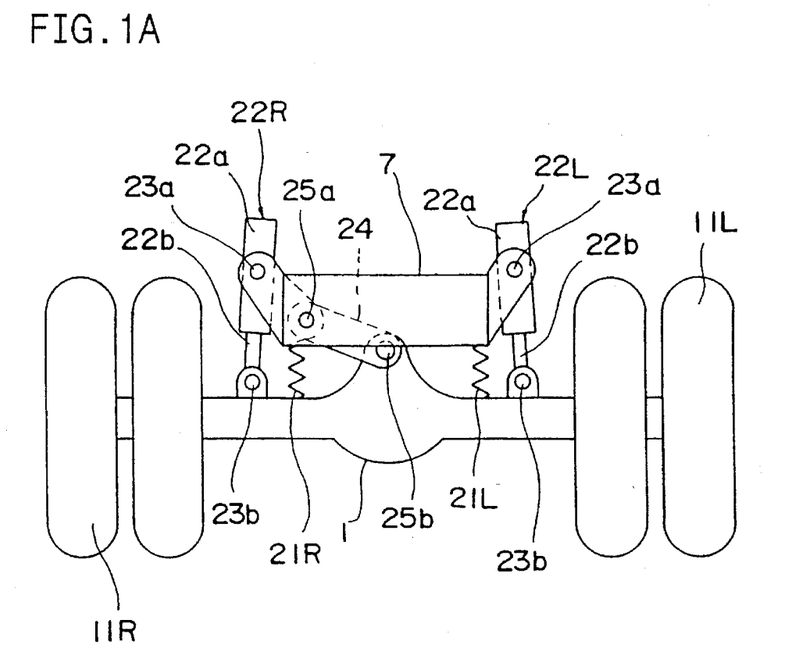
FIG. 1A is a drawing showing a summary of the construction of a suspension system which is an embodiment of the present invention.

FIG. 1A is for explaining a summary of the construction of a suspension system according to the present invention. Shock absorbing springs 21L and 21R are interposed between an axle 1 and a chassis frame 7, and tube portions 22a and rod portions 22b of a pair of double acting cylinders 22L and 22R, which are provided a fixed distance apart in the lateral direction of the vehicle, are respectively connected to the chassis frame 7 and to the axle 1 by pins 23a and 23b. Further, one end of a link 24, which restrains horizontal displacement in the longitudinal and the lateral directions between the chassis frame 7 and the axle 1 while allowing displacement in the vertical direction, is connected to the chassis frame 7 by a pin 25a, while its other end is connected by a pin 25b to the portion of the axle 1 which is central with respect to the vehicle.

Figure 1B:
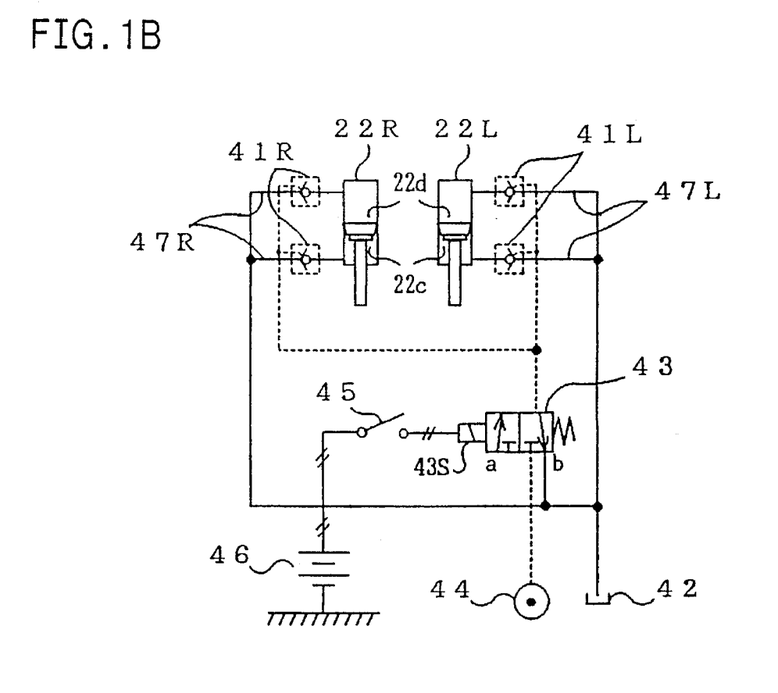
FIG. 1B is a figure showing a hydraulic circuit which switches over to lock or to unlock double acting cylinders shown in FIG. 1A.

As shown in FIG. 1B, the rod chambers 22c and the bottom chambers 22d of the double acting cylinders 22L and 22R are connected to a tank 42 via pilot operated check valves 41L and 41R respectively. The respective pilot ports of the pilot operated check valves 41L and 41R are connected to a hydraulic pressure source 44 via a solenoid controlled valve 43, and a solenoid portion 43S of this solenoid controlled valve 43 is connected to a battery 46 via a switch 45.

During excavation the switch 45 is open, while during vehicle propulsion the switch 45 is closed. When the switch 45 is closed, the solenoid controlled valve 43 is shifted to its "all position, and hydraulic pressure from the hydraulic pressure source 44 acts upon the respective pilot ports of the pilot operated check valves 41L and 41R and the pilot operated check valves 41L and 41R are opened, so that the double acting cylinders 22L and 22R become free. When the switch 45 is opened, the solenoid controlled valve 43 is shifted to its "b" position, and the respective pilot ports of the pilot operated check valves 41L and 41R are connected to the tank 42 and the rod chambers 22c and the bottom chambers 22d are respectively shut off by the pilot operated check valves 41L and 4IR from the tank 42, so that the double acting cylinders 22L and 22R become locked.

Moreover, it would also be acceptable to provide restrictors in the lines 47L and 47R, so that during vehicle propulsion the double acting cylinders 22L and 22R are made to function as hydraulic dampers.

Figure 2:
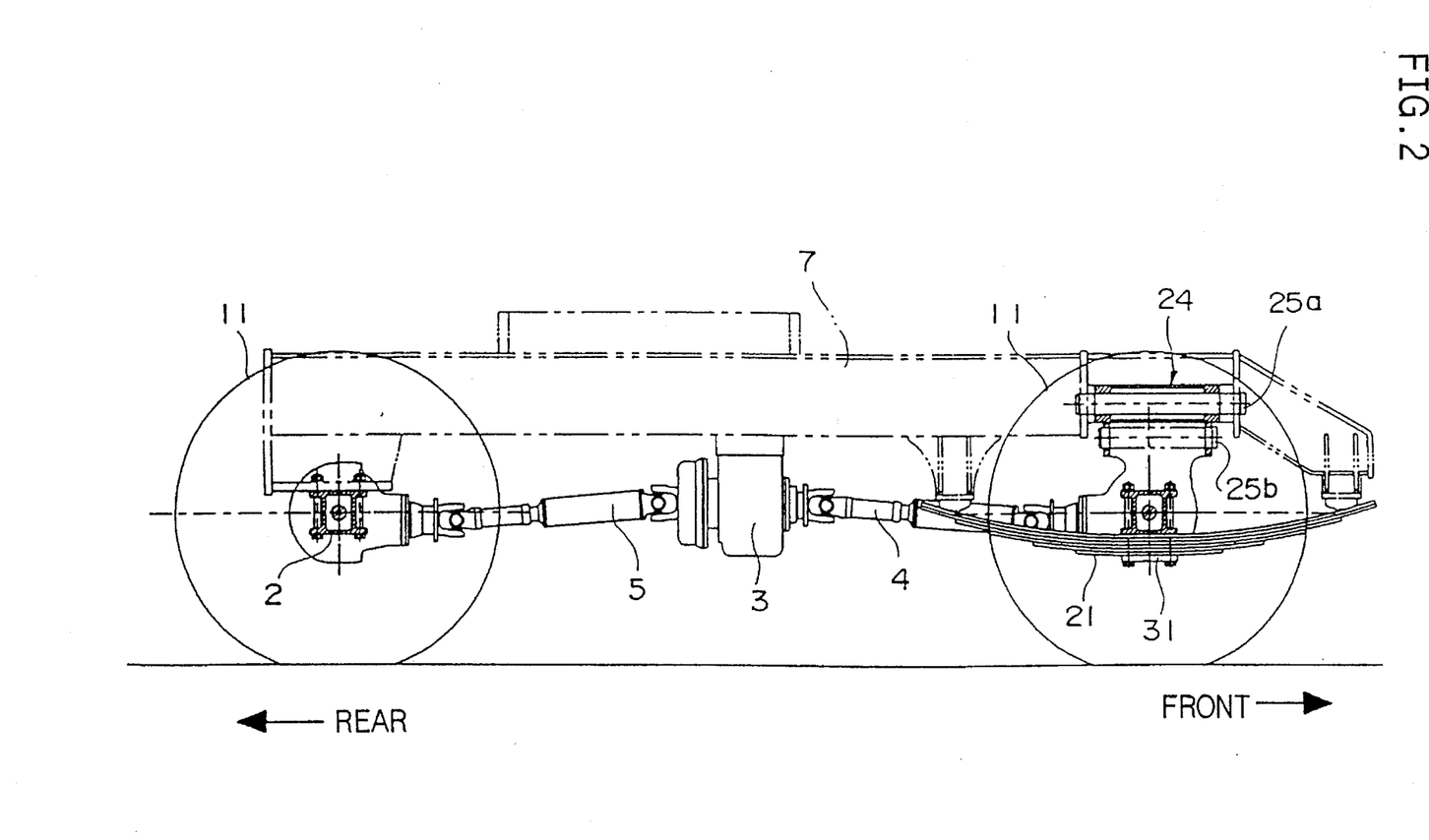
FIG. 2 is a side view of a wheel type hydraulic shovel on which a suspension system according to this embodiment has been provided for the front wheels.
Figure 3:
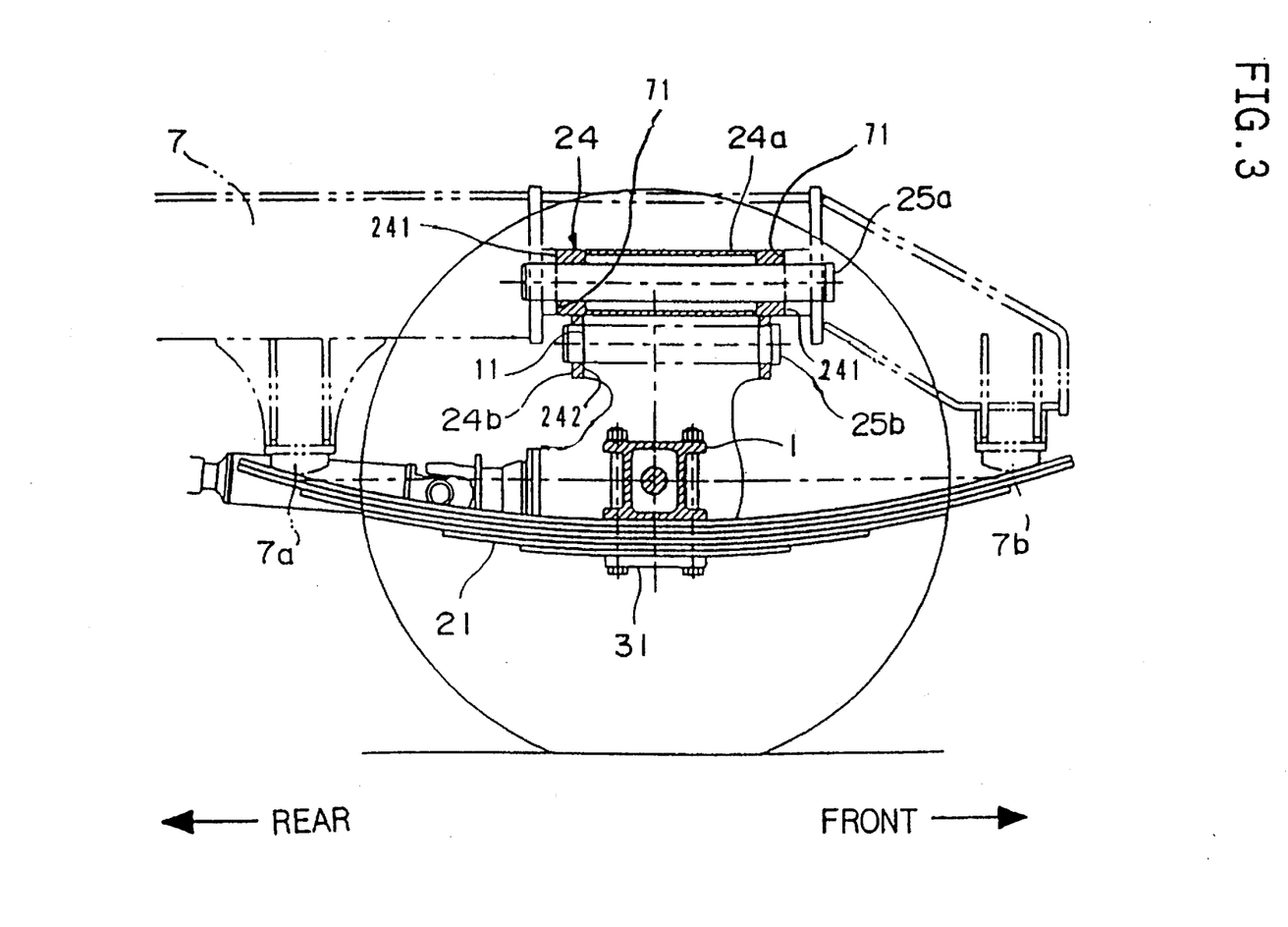
FIG. 3 is a magnified view of a required portion of FIG. 2, showing the details of the attachment portions of a shock absorbing spring.
Figure 4:
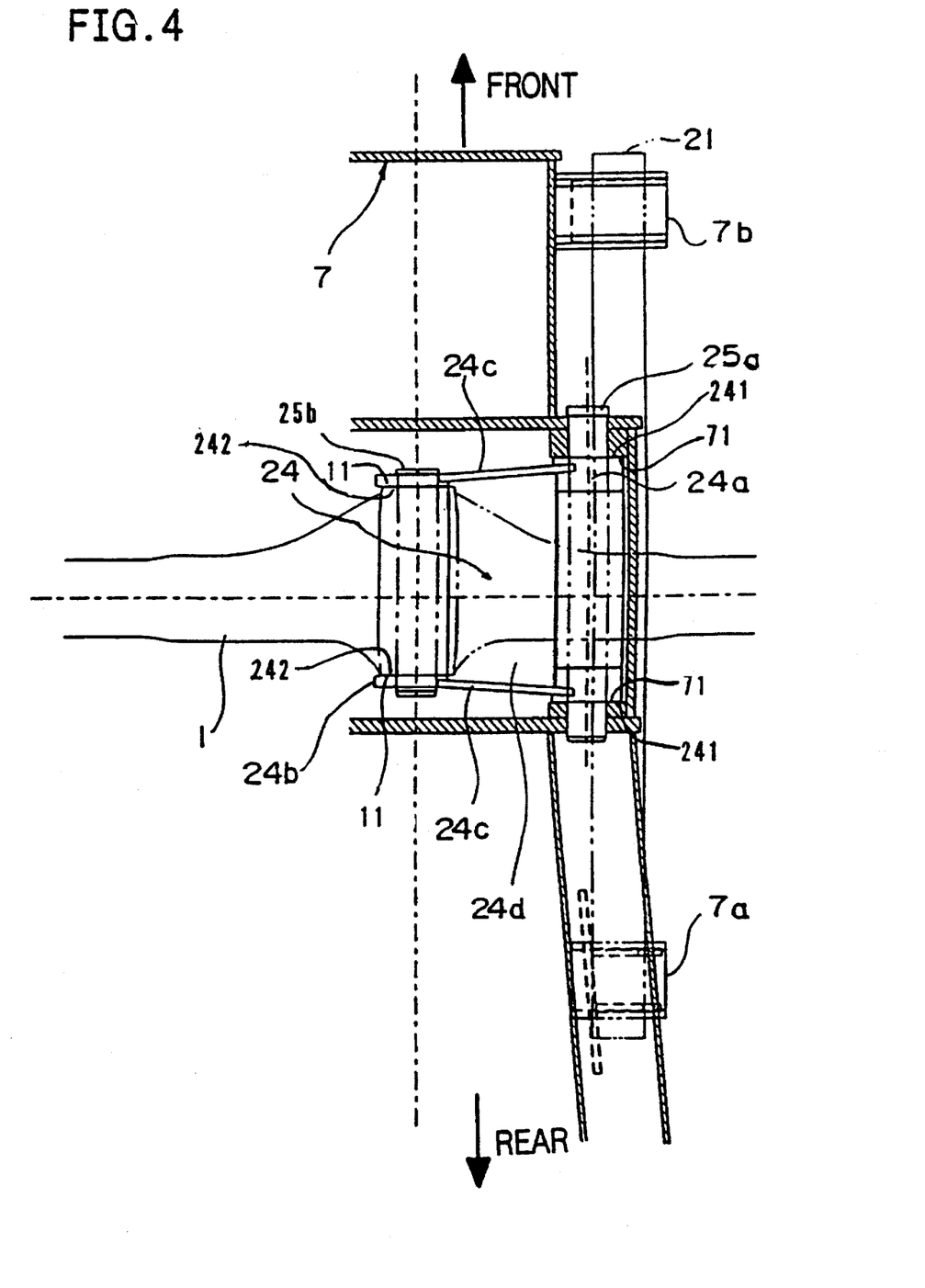
FIG. 4 is a magnified plan view of a required portion of FIG. 2, showing the details of the attachment portions of a link.

FIG. 2 is a side view of a wheel type hydraulic shovel on which a suspension system according to this embodiment has been provided for the front wheels, FIG. 3 is a magnified view of a required portion of FIG. 2 showing the details of the attachment portions of a shock absorbing spring, and FIG. 4 is a plan view showing the details of the attachment portions of the link 24; the left sides of FIGS. 2 and 3 correspond to the rear of the vehicle, and the lower edge of FIG. 4 corresponds to the rear of the vehicle. Furthermore, in the following explanation, "L" and "R" will be omitted for elements which are the same on the left and right sides.

As is clearly shown in FIG. 3, the shock absorbing spring 21 comprises a lamellar spring which is fixed by a fixing member 31 to the bottom surface of the axle 1, and spring receiving portions 7a and 7b which are provided as projecting in the downward direction from the chassis frame 7 are contacted against the upper surfaces of both the end portions of the lamellar spring 21 in the longitudinal direction of the vehicle; and shocks from the tires 11 are absorbed by the lamellar spring 21.

Referring to FIGS. 3 and 4, the link 24 is provided with a cylindrical connecting portion 24a which is linked by a pin 25a to the chassis frame 7, flange shaped pin connecting portions 24b which are linked to the axle 1 by a pin 25b, a pair of side plates 24c which connect together the pin connection portions 24a and 24b, and a pair of upper and lower cover plates 24d. By connecting the chassis frame 7 and the axle 1 together by this type of link 24, horizontal displacement in the longitudinal and in the lateral direction between the chassis frame 7 and the axle 1 is restrained, while displacement in the vertical direction is allowed. That is, the cylindrical connecting portion 24a has side walls 241 and 242 perpendicular to the longitudinal direction of the vehicle at the chassis frame side end and the axle side end. The chassis frame 7 has connecting portions provided with side walls 71 which are contact with the side walls 241. The axle 1 has connecting portions provided with side walls 11 which are contact with the side walls 242. Load in a longitudinal direction of the vehicle is received with this construction of the connecting portions. Among the members which make up the link 24, in particular the side plates 24c ensure strength in the lateral direction of the vehicle. And the side plates 24c are in particular greatly reinforced in the longitudinal direction of the vehicle by being connected to the cover plate 24d, so that high strength is provided with a single link 24 both in the longitudinal direction and in the lateral direction of the vehicle. In this embodiment, the side plates 24c correspond to linking members, while the cover plate 24d corresponds to a reinforcing member.

Figure 5:
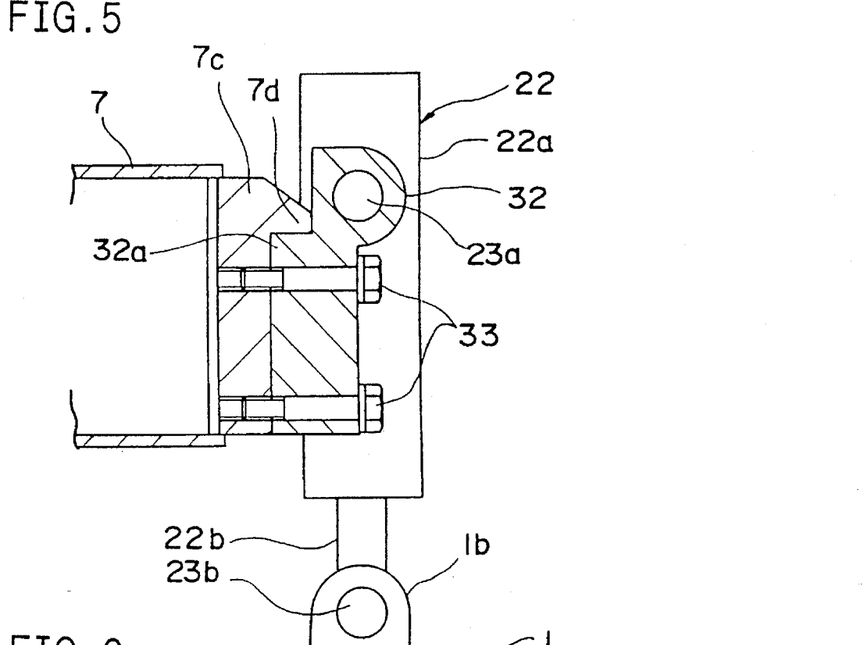
FIG. 5 is a view looking forwards along the vehicle at the right side portion thereof, showing the details of the attachment portions of a double acting cylinder.
Figure 6:
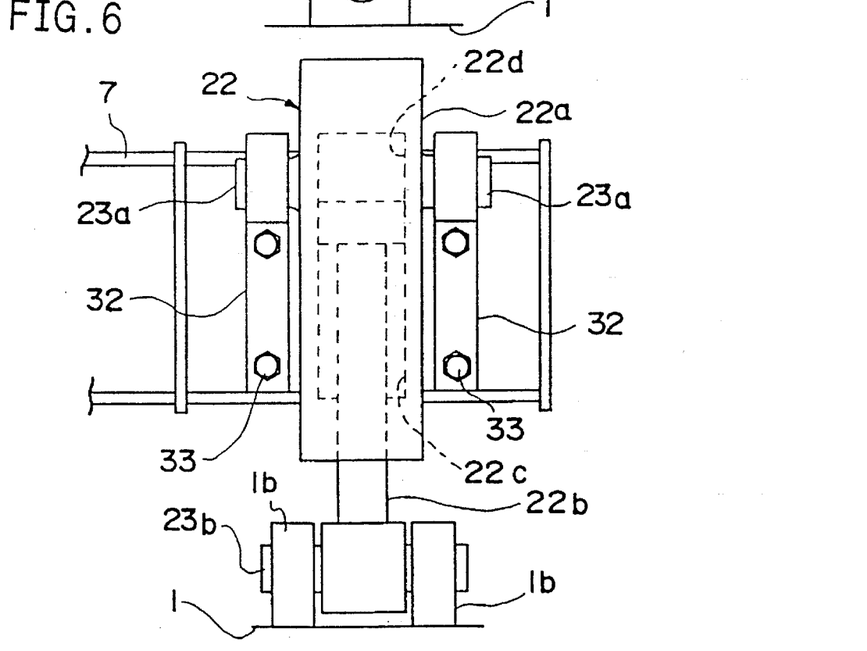
FIG. 6 is a right side view of FIG. 5.

FIG. 5 and FIG. 6 show the details of the attachment portions of the double acting cylinder 22, and FIG. 5 is a view looking forwards along the vehicle at the right side portion of the vehicle, while FIG. 6 is an elevation view thereof. A block 7c from which load bearing portions 7d are provided as projecting is welded on the right side surface of the chassis frame 7, and on this block 7c there are screwed by bolts 33 a pair of brackets 32 which are provided with load bearing portions 32a which engage with the load bearing portions 7d. Pins 23a are provided as projecting respectively in the forwards and the rearwards direction of the vehicle from two opposing side surfaces of the tube 22a of the double acting cylinder 22, and the pins 23a are inserted into the brackets 32 and thereby the double acting cylinder 22 is linked to the chassis frame 7. On the other hand, a pair of brackets 1b are provided on the upper surface of the axle 1, and the piston rod 22b of the double acting cylinder 22 is linked to the axle 1 by a pin 23b.

Now the operation of the suspension system which is constructed as described above will be explained.

During vehicle propulsion the switch 45 is closed, and both the rod chambers 22c and the bottom chambers 22d of the double acting cylinders 22L and 22R are connected to the tank and are kept free. When the tire on the right side rides up and over a bump, the lamellar spring 21R is deflected, and the axle 1 is swivelled in the clockwise direction as seen in FIG. 1 around the pin 25b as a center. At this time, the piston rods 22b of the left and right pair of double acting cylinders 22L and 22R extend and retract according to the swivelling of the axle 1. At this time, although a hydraulic pressure resistance force is slightly generated by the extending and retracting motion of the double acting cylinders 22L and 22R, the shocks from the road surface are mainly absorbed by the deflecting of the lamellar springs 21.

When a shock is received from the tire on the left side, only the direction of swivelling of the axle 1 is opposite, and the shock absorbing operation for the shock force by the lamellar springs 21 are identical. Further, when both the left and the right tires ride up and over a bump at the same time, the left and right lamellar springs 21L and 21R are deflected at the same time, and the shock is absorbed. At this time, the lamellar springs 21 are able to deflect until the double acting cylinders 22 are retracted to their retracting limits. When both the tires fall off from the bump, the lamellar springs 21 are able to deflect until the double acting cylinders 22 are extended to their extending limits.

In this manner, since the shocks from the road surface are mainly absorbed by the lamellar springs 21R and 21L, thereby contrary to the prior art the shocks from the road surface do not act directly on the chassis frame 7. Further, when the tire falls off a bump which it has ridden up and over, although in the prior art the axle 1 fell downwards accompanying the tire, according to this embodiment, because the axle 1 is connected to the chassis frame 7 by the double acting cylinders 22, it falls down slowly in comparison with the prior art, due to the resistance force when the double acting cylinders 22 extend. According to the above, the riding quality according to this embodiment of the suspension system is improved.

Further, although in the prior art the chassis frame 7 undesirably rolled during vehicle high speed cornering due to the rolling load which acted, according to the suspension system shown in the drawings, because the moment load acting upon the chassis frame 7 around the pin 25b due to the rolling load is absorbed by the spring force of the lamellar springs 21R and 21L, thereby the rolling of the chassis frame 7 during vehicle high speed cornering is restrained, and in comparison to the prior art the anti rolling performance is improved.

The reason why both the ends of the lamellar springs 21R and 21L are not fixed to the chassis frame 7 is as follows. The chassis frame 7 can be displaced leftwards and rightwards with respect to the axle 1, because they are connected together by the link 24. Accordingly, the construction is such that, without the lamellar springs 21R and 21L being fixed to the chassis frame 7, their movement in the leftwards and rightwards direction of the chassis frame 7 is permitted.

Moreover, in the case that the double acting cylinders 22 are provided with a hydraulic damping function, the moment load around the pin 25b acting upon the chassis frame 7 due to the rolling load is absorbed by the spring force of the lamellar springs 21R and 21L and by the hydraulic pressure force of the double acting cylinders 22L and 22R.

On the other hand, during excavation, the switch 45 is opened, and the rod chambers 22c and the bottom chambers 22d of the double acting cylinders 22 are shut off by the pilot operated check valves 41L and 41R from the tank 42, so that the double acting cylinders 22L and 22R are locked, and the action of the lamellar springs 21L and 21R is prevented. By doing this, swivelling of the chassis frame 7 around the pin 25b is restrained by the double acting cylinders 22, and movement of the vehicle in the forward, backward, leftward, and rightward directions is restrained by the link 24. Accordingly, although the riding quality using the lamellar springs 21L and 21R is improved over the prior art, there is no loss of stability of the vehicle during excavation.

Further, since the pins 23a are provided as protruding from central portions of the tubes 22a of the double acting cylinders 22, and the double acting cylinders 22 are linked to the chassis frame 7 by these pins 23a, the total length in the vertical direction of the suspension system is reduced, by comparison with the case in which the base end portions of the tubes are linked to the chassis frame 7.

Yet further, because the load bearing portions 32a of the brackets 32 to which the double acting cylinders 22 are attached are engaged to the load bearing portions 7d of the chassis frame 7, no shearing force due to the load during excavation or the load input from the road surface acts upon the bolts 33 for fixing on the brackets 32, so that no problem arises on the strength.

Moreover, the present invention is not limited to the above embodiment, and variations are possible like the following:

(1) Coil springs can also be used for the shock absorbing springs. In this case, it is desirable for the double acting cylinders to be provided with a hydraulic damping function.

(2) Any construction for the double acting cylinders will be acceptable, as long as it allows them to be locked up during excavation and freed during vehicle propulsion.

(3) Although with the above described link displacement of the chassis frame in the lateral direction of the vehicle is not absolutely prevented because the chassis frame swivels with respect to the axle, it would also be acceptable to prevent any displacement in the horizontal direction by a link, and various forms of link could be used.

(4) Although the explanation has been made for the case in which the suspension system is provided for the front wheels, it would also be acceptable to provide it for the rear wheels only, or for both the front and the rear wheels.

Industrial Applicability

Although the explanation has been made with reference to a wheel type hydraulic shovel, the present invention is also applicable to various types of work vehicle which perform both vehicle propulsion and working.

We claim:

1. A lockable suspension system for a work vehicle having a stabilizing link, which supports a chassis frame on a pair of front and rear wheel axles, and which during working causes load in the vertical direction, in the lateral direction, and in the longitudinal direction of said vehicle from said chassis frame to be transferred to said axles, comprising:

a shock absorbing spring which is interposed between at least a one of said axles and said chassis frame;

a pair of double acting cylinders which are provided at a fixed distance apart in the lateral direction of said vehicle, and whose tube sides and rod sides are respectively pivotally supported by said chassis frame and said axle;

a single link whose one end is linked to said chassis frame while the other end is linked to said axle so as to restrain horizontal displacement in the longitudinal and in the lateral direction while permit displacement in the vertical direction between said chassis frame and said axle, and which during working receives load in the longitudinal and in the lateral direction of said vehicle, wherein at the axle and chassis frame linking ends of said link, said link having side walls perpendicular to the longitudinal direction of the vehicle and opposed to each other, said side walls being in contact with receiving walls provided on said chassis frame and axle so that said load in the longitudinal direction can be received by contact of said side walls with said receiving walls; and, a changeover means which by locking said double acting cylinders obstructs the action of said shock absorbing spring, and by freeing said double acting cylinders permits the action of said shock absorbing spring.

2. A lockable suspension system for a work vehicle having a stabilizing link according to claim 1, wherein the axle side linking point of said link is engaged by a pin to portion of said axle central with respect to said vehicle, and the chassis frame side linking point of said link is engaged by a pin to a side portion of said chassis frame.

3. A lockable suspension system for a work vehicle having a stabilizing link according to claim 1, wherein intermediate portions of said double acting cylinders are engaged by pins to said chassis frame respectively.

4. A lockable suspension system for a work vehicle having a stabilizing link according to claim 3, wherein:

said pins are provided as projecting from said double acting cylinders respectively in the forward direction and the backward direction of said vehicle;

a pair of brackets are fixed by bolts to said chassis frame with locating said double acting cylinder between them; said pins are received in said brackets; and, said brackets and chassis frame are engaged together so that shearing force due to the load inputted from the road surface via said double acting cylinder does not act on the fixing portions of said bolts.

5. A lockable suspension system for a work vehicle having a stabilizing link according to claim 1, wherein:

said shock absorbing spring comprises a pair of lamellar springs which are respectively fixed to said axle as spaced apart by a fixed amount in the lateral direction of said vehicle and which extend in the longitudinal direction of said vehicle;

a pair of receiving portions for receiving said lamellar springs are provided to the lower surface of said chassis frame as spaced apart by a fixed amount in the lateral direction of said vehicle; and, said chassis frame is supported via said receiving portions on the upper surfaces of both end portions in the longitudinal direction of said vehicle of said lamellar springs in a state which permits displacement in the horizontal direction.

6. A lockable suspension system for a work vehicle having a stabilizing link according to claim 1, wherein said link, said shock absorbing spring, and said left and right pair of double acting cylinders are provided for said front wheel axle.

7. A lockable suspension system for a work vehicle having a stabilizing link according to claim 1, wherein said changeover means comprises a hydraulic circuit which connects together rod chambers and bottom chambers of said double acting cylinders during vehicle propulsion, and shuts off said rod chambers and said bottom chambers of said double acting cylinders during excavation work.

8. A lockable suspension system for a work vehicle having a stabilizing link, which supports a chassis frame on a pair of front and rear wheel axles, and which during working causes load in the vertical direction, in the lateral direction, and in the longitudinal direction of said vehicle from said chassis frame to be transferred to said axles, comprising:

a shock absorbing spring which is interposed between at least a one of said axles and said chassis frame;

a pair of double acting cylinders which are provided at a fixed distance apart in the lateral direction of said vehicle, and whose tube sides and rod sides are respectively pivotally supported by said chassis frame and said axle;

a link which connects said axle and said chassis frame and during working receives load in the longitudinal and in the lateral direction of said vehicle, whose linking point to said axle is engaged by a pin extending in the longitudinal direction of said vehicle to a portion of said axle central with respect to said vehicle, and whose linking point to said chassis frame is engaged by a pin extending in the longitudinal direction of said vehicle to a side portion of said chassis frame, said linking points to said axle and said chassis frame having side walls, respectively, perpendicular to the longitudinal direction of the vehicle and opposed to each other, said side walls being in contact with receiving walls provided on said chassis frame and axle so that said load in the longitudinal direction can be received by contact of said side walls with said receiving walls; and, a changeover means which by locking said double acting cylinders obstructs the action of said shock absorbing spring, and by freeing said double acting cylinders permits the action of said shock absorbing spring; wherein, intermediate portions of said double acting cylinders are engaged by pins to said chassis frame respectively;

said shock absorbing spring comprises a pair of lamellar springs which are respectively fixed on the lower surface of said axle as spaced apart by a fixed amount in the lateral direction of said vehicle and which extend in the longitudinal direction of said vehicle;

respective spring receiving portions are provided to the lower surface of said chassis frame as spaced apart by a fixed amount in the lateral direction of said vehicle; and, said chassis frame is supported via said pair of spring receiving portions on the upper surfaces of both end portions in the longitudinal direction of said vehicle of said lamellar springs in a state which permits displacement in the lateral direction of said vehicle.

9. A lockable suspension system for a work vehicle having a stabilizing link according to claim 8, wherein:

said pins are provided as projecting from said double acting cylinders respectively in the forward direction and the backward direction of said vehicle;

a pair of brackets are fixed by bolts to said chassis frame with locating said double acting cylinder between them;

said pins are received in said brackets; and, said brackets and chassis frame are engaged together so that shearing force due to the load inputted from the road surface via said double acting cylinder does not act on the fixing portions of said bolts.

10. A lockable suspension system for a work vehicle having a stabilizing link, according to claim 8, wherein said link, said shock absorbing spring, and said left and right pair of double acting cylinders are provided for said front wheel axle.

11. A lockable suspension system for a work vehicle having a stabilizing link, according to claim 8, wherein said changeover means comprises a hydraulic circuit which connects together rod chambers and bottom chambers of said double acting cylinders during vehicle propulsion, and shuts off said rod chambers and said bottom chambers of said double acting cylinders during excavation work.

12. A lockable suspension system for a work vehicle having a stabilizing link, which supports a chassis frame on a pair of front and rear wheel axles, and which during working causes load in the vertical direction, in the lateral direction, and in the longitudinal direction of said vehicle from said chassis frame to be transferred to said axles, comprising:

a shock absorbing spring which is interposed between at least a one of said axles and said chassis frame;

a pair of double acting cylinders which are provided at a fixed distance apart in the lateral direction of said vehicle, and whose tube sides and rod sides are respectively pivotally supported by said chassis frame and said axle;

a link whose one end is linked to said chassis frame while the other end is linked to said axle so as to restrain horizontal displacement in the longitudinal and in the lateral direction while permit displacement in the vertical direction between said chassis frame and said axle, which during working receives load in the longitudinal and in the lateral direction of said vehicle, and comprising a linking member which extends from the linking point to said chassis frame to the linking point to said axle and a reinforcing member which reinforces said linking member in one direction among the longitudinal direction and the lateral direction of said vehicle in which the strength of said linking member is relatively low, said linking points to said axle and said chassis frame having side walls perpendicular to the longitudinal direction of the vehicle and opposed to each other, said side walls being in contact with receiving walls provided on said chassis frame and axle so that said load in the longitudinal direction can be received by contact of said side walls with said receiving walls; and, a changeover means which by locking said double acting cylinders obstructs the action of said shock absorbing spring, and by freeing said double acting cylinders permits the action of said shock absorbing spring.

13. A lockable suspension system for a work vehicle having a stabilizing link, according to claim 12, wherein:

said shock absorbing spring comprises a pair of lamellar springs which are respectively fixed to said axle as spaced apart by a fixed amount in the lateral direction of said vehicle and which extend in the longitudinal direction of said vehicle;

respective spring receiving portions are provided to the lower surface of said chassis frame as spaced apart by a fixed amount in the lateral direction of said vehicle; and, said chassis frame is supported via said pair of spring receiving portions on the upper surfaces of both end portions in the longitudinal direction of said vehicle of said lamellar springs in a state which permits displacement in the horizontal direction.

14. A lockable suspension system for a work vehicle having a stabilizing link, according to claim 12, wherein:

said linking member of said link comprises a front side linking member which connects together the end portions towards the front of said vehicle of a pair of pins which are provided at said linking point to said axle and at said linking point to said chassis frame and which extend in the longitudinal direction of said vehicle, and a rear side linking member which connects together end portions towards the rear of said vehicle of said pair of pins; and, said reinforcing member is provided so as to connect together said front side linking member and this rear side linking member in the longitudinal direction of said vehicle.

* * * * *